(12) United States Patent
Pinches

(10) Patent No.: US 8,796,479 B2
(45) Date of Patent: Aug. 5, 2014

(54) PROCESS AND APPARATUS FOR TREATING WASTE MATERIAL INCORPORATING LIPID CONTAINING MATERIAL TO RECOVER THE LIPID

(76) Inventor: David Kenneth Pinches, Victoria (AU)

( * ) Notice: Subject to any disclaimer, the term of this patent is extended or adjusted under 35 U.S.C. 154(b) by 329 days.

(21) Appl. No.: 11/658,176

(22) PCT Filed: Jul. 22, 2005

(86) PCT No.: PCT/AU2005/001066
§ 371 (c)(1),
(2), (4) Date: Apr. 23, 2007

(87) PCT Pub. No.: WO2006/007649
PCT Pub. Date: Jan. 26, 2006

(65) Prior Publication Data
US 2008/0004456 A1 Jan. 3, 2008

(30) Foreign Application Priority Data
Jul. 23, 2004 (NZ) ........................................ 534282

(51) Int. Cl.
*C11B 1/16* (2006.01)
(52) U.S. Cl.
CPC ....................................... *C11B 1/16* (2013.01)
USPC .................. 554/23; 544/8; 544/175; 544/177
(58) Field of Classification Search
CPC ....................................................... C11B 1/16
USPC ............ 426/417, 441, 480; 203/47; 159/16.3; 554/23
See application file for complete search history.

(56) References Cited

U.S. PATENT DOCUMENTS

| | | | |
|---|---|---|---|
| 2,035,126 A * | 3/1936 | Harris | 554/19 |
| 2,368,028 A * | 1/1945 | Kernot et al. | 554/19 |
| 3,519,662 A | 7/1970 | Gruver, Jr. | |
| 3,950,230 A * | 4/1976 | Greenfield et al. | 203/47 |
| 4,933,199 A | 6/1990 | Neel | |
| 5,846,589 A * | 12/1998 | Baker et al. | 426/439 |
| 2005/0042346 A1 * | 2/2005 | Garwood | 426/478 |

FOREIGN PATENT DOCUMENTS

| | | |
|---|---|---|
| DK | 210545 | 6/1984 |
| GB | 191321331 | 0/1916 |
| GB | 486 169 A | 5/1938 |
| GB | 1362810 | 8/1974 |
| JP | 55 138365 A | 10/1980 |
| JP | 08-252177 | 10/1996 |
| WO | WO97/40706 | 11/1997 |

OTHER PUBLICATIONS

Gracey JF, Treatment and Disposal of By-products, Meat Hygiene (8th Ed. 1986), Ch. 4, pp. 97-108.
Database WPI Week 200013, Thompson Scientific, London, GB, AN 2000-139532, XP002594444 & JP 11342379 A (Kagaku Gijutsu Shinko Jigyodan), Abstract, Dec. 14, 1999.

* cited by examiner

*Primary Examiner* — Yate K Cutliff
(74) *Attorney, Agent, or Firm* — Jacobson Holman, PLLC.

(57) ABSTRACT

A process for recovering a lipid from a lipid containing material, comprising subjecting the lipid containing material to superheated steam and recovering the lipid in a liquid state.

11 Claims, 6 Drawing Sheets

PROCESS AND APPARATUS FOR TREATING WASTE MATERIAL INCORPORATING LIPID CONTAINING MATERIAL TO RECOVER THE LIPID

This is a national stage of PCT/AU2005/001066 filed 22 Jul. 2005 and published in English.

This invention relates to the treatment of waste material such as animal tissues incorporating lipid containing material such as tallow.

BACKGROUND

The rendering of animal tissues such as those remaining after removing the edible meat in a meat processing plant, is generally designed to produce three major fractions, tallow, protein/bone meal (more generally termed meat and bone meal) and a waste stream of water. Both tallow and the meat and bone meal are commercially significant products. Sterilization is an important influence on quality and hence on the price that can be obtained.

Rendering of animal tissues by heat is carried out principally by two methods: dry or high temperature rendering; and wet or low temperature rendering.

In the high temperature process the raw material is heated, separated into the tallow, the fat-free solid and water phases and dried in the same operation. This process suffers from drawbacks: 10-15% residual fat in the cooked product; the resultant tallow must be thoroughly washed to ensure the product is of a premium grade; the high temperature can result in a degradation of the nutritive value of the tallow; and the process requires a high energy input.

In the low temperature process the raw material is heated to 50 to 60° C. to form a hot slurry, and the solids are separated from the liquids. The temperature must be sufficient to liquefy the tallow without evaporating the water. The solids stream contains protein and water and the liquids stream contains tallow, soluble protein and water. The liquid stream is further separated into a heavy phase and a light phase, with the light phase having an increased amount of tallow. The heavy phase and the solid phase are combined to form a meal and bone product. The disadvantages of this process are: the water (stickwater) has a significant tallow content of between 10-15%; and the adequacy of degree of sterilization of the tallow has been questioned.

SUMMARY OF THE INVENTION

In broad terms in one aspect the invention comprises a method of recovering a lipid from a lipid containing material, for example tallow from a tallow containing material, comprising subjecting the lipid containing material to superheated steam and recovering the lipid in a liquid state.

In accordance with the invention the heating of the lipid containing material is by the use of superheated steam under conditions such that a substantial amount of the lipid melts but does not vaporize while at the same time a substantial amount of the water in the material is vaporized and entrained in the superheated steam.

The lipid containing material in the case of meat processing will generally be a tallow containing material such as the waste material after separation of the edible meat in a meat processing plant. Reference throughout the specification will be to such meat waste material unless specifically stated otherwise. It is to be understood that the process can be used with other lipid and water containing products, for example in fish rendering.

The waste product from a meat processing plant generally contains tallow, bone and meat as well as water. The rendering process is designed to extract: as much as possible of the tallow in a sterilised state; water with as little tallow as possible; and the meat and bone residue.

By the process of the invention the meat waste material is subjected to the superheated steam at temperatures and for a time sufficient for a substantial amount of the tallow to be liquefied, sterilised and be then separated from the residue, but for a sufficiently short period of time so that degradation of the tallow is minimized.

By the invention the temperature and time of contact of the superheated steam with the feed material is sufficient to entrain a large amount of the water in the material. The remaining solid materials containing some residual tallow, desirably as little as possible, and some residual water, again desirably as little as possible, are fed to a second stage recovery process where further tallow is removed from the solids and even a third stage where still further tallow can be recovered.

During contact with the superheated steam, the tallow and the solid materials are sterilised. The initially recovered tallow by this invention is of a high quality. The tallow recovered at the second or the third stages may not be of the quality initially obtained.

In accordance with a further feature of the invention, the steam used in the process is recycled and returned for treatment of further tallow containing material.

The process can operate on a continuous basis with new tallow containing material being fed continuously into a suitable processing chamber where it is subjected to a continuous flow of superheated steam for the time sufficient to achieve the desired properties in the products of the invention as discussed above.

The steam after separation from the solid residue is fed sequentially through a further separation step (where fine residual solids are removed which are fed back into the start of the cycle), through a fan to ensure adequate velocity of the steam throughout the process cycle, through a siphon step whereby excess steam is removed to leave an amount of steam substantially equivalent to that which started the cycle and through a heating step where the steam is heated by a suitable heating means to return it to its starting temperature and the cycle can then repeat itself.

The temperature of the steam needs to be sufficient to achieve the desired effect of liquefying the tallow rapidly while at the same time sterilizing it adequately but also to ensure it remains in vapour throughout the process cycle.

In accordance with another feature of the invention, the process includes a step of monitoring the temperature of the superheated steam after subjecting the tallow containing material to the steam and, if necessary, adjusting the temperature of the incoming steam before contacting the tallow containing material to ensure that the steam remains in a vapour state throughout the cycle.

The initial temperature of the steam is then dependent upon a number of variables but primarily designed to ensure that the tallow is liquefied and sterilised to the greatest extent possible while minimizing the degradation of it, to ensure that substantially all the water in the feed material is entrained in the steam and to ensure that the steam is at above its condensation point. A useful temperature range is between about 130° C. to about 600° C., preferably between about 220° C. to about 350°. Higher temperatures may be used under certain conditions, for example, in another embodiment the temperature may be at least 450° C. This can depend on the corrosiveness of the steam which will depend on the nature and amount of substances in the steam and the temperature and the material used in the apparatus. Stainless steel will usually be the preferred material but if high temperatures are desired then other alloys may be used which are less susceptible to corrosion by a steam environment which includes corrosive substances.

The raw material is preferably ground to a fine particle state to ensure that the steam can contact the material as evenly as possible in a short timeframe. A satisfactory particle size is achieved by passing the raw material through a 20 mm hole plate which generally gives a particle size of about 10 mm. Hence the raw material is ground in a suitable grinder and fed to a holding bin for feeding a continuous supply in a continuous operation into a suitable processing chamber. That grinder desirably is one which both prebreaks and minces at the same time.

The processing chamber is desirably a rotating cylinder again to ensure maximum contact of the steam with the raw material in as short a timeframe as possible. The flow of the material through the chamber can be under the force of the steam flow, and can be assisted by lifter bars. Lifter bars distribute material across the drum to aid in the contact process and add forward momentum to the material.

The steam velocity through the chamber is designed in association with a number of variables such as the volume of raw material, the steam temperature and distance of the tallow recovery screens from the entry port. A steam flow of between about 1.5 $ms^{-1}$ and about 6 $ms^{-1}$, more preferably between about 2 $ms^{-1}$ and about 2.5 $ms^{-1}$ and most preferably about 2.5 $ms^{-1}$ is a suitable velocity.

The apparatus of the invention is designed preferably to be a closed loop so that only steam vapours are present in it together with any other vapours from the feed material during processing and thus in a further aspect of the invention there is provided a process for treating lipid (such as tallow) containing material to recover lipid and other by products in which the lipid containing material is subjected to superheated steam under conditions such that substantially no oxygen is present during times when the lipid containing material is subjected to treatment with the superheated steam.

As mentioned above the steam is preferably recycled so that the process operates substantially continuously. Excess steam that accumulates in the vapour train from the moisture in the tallow containing material needs to then be siphoned off. This can be through a pipe coupled with a valving system to prevent back flow.

The siphoned off steam can be then fed through a condenser containing water. In this way cold water fed into the condenser is converted to hot water which is recovered and the heat values in that water can be utilized. Surplus cold water which accumulates in the condenser is bled off. By the process of the invention this water is in a substantially pure state and able to be discharged without serious detriment to the environment.

As part of the siphoned off steam, non-condensable gases are present such as odorous corrosive compounds. These can be fed into the combustion unit which heats the steam in the heat exchanger before the steam enters the product treatment chamber. Because of the lack of air in the treatment system, the odorless nature of the whole apparatus is much improved, because the volume of such non-condensables is substantially reduced.

According to another aspect of the invention there is provided an apparatus for separating a lipid (such as tallow) from a lipid and water containing material comprising a treatment chamber for allowing lipid containing product to be subjected to superheated steam under such conditions that a substantial part of the lipid is converted to a liquid state and a substantial part of the water is vaporised, means for supplying superheated steam to the chamber, means for supplying a lipid containing material to the chamber, means for extracting the lipid in a liquid state, means to extract the steam and means to extract the solid residue.

Preferably the apparatus also includes a ducting means to recycle the steam back to the inlet.

Preferably there is a separating means in the ducting means to separate fine solids from the vapour steam, and more preferably there is a means to return the solids back to the lipid containing material feed supply.

Preferably there is a siphoning means to siphon off excess vapour within the steam ducting means and more preferably there is a means for recovering the heat values in the siphoned off vapor and even more preferably there is a means to separate the non-condensables from the condensed excess vapour.

Preferably there is a means to grind the lipid containing raw material to a finely divided state.

Preferably there is a tallow extracting means in the chamber, for example a perforated s/s screen and/or a wire wedge screen.

Preferably the treatment chamber is a rotating cylinder.

Preferably the treatment chamber contains at the inlet and the exit end, temperature probes to measure the temperature of the steam. More preferably, there is a means which in association with the output from the temperature probe at the exit end, is programmed to adjust the heating means for the steam to raise or lower the temperature of the steam as it enters the chamber.

In a preferred embodiment of the method and apparatus described above the tallow recovery/separation takes place at atmospheric pressure. In an alternative embodiment the tallow extraction/separation takes place at an elevated pressure.

According to a further aspect of the invention there is provided a method of regulating the temperature of superheated steam flowing through a chamber in which it acts on a water containing material to vaporize the water, comprising sensing the temperature of the superheated steam after it has contacted the water containing material, comparing the temperature to a predetermined value and, where necessary, automatically adjusting the temperature of the steam before it contacts the water containing material.

The invention provides high quality tallow and water in a more purified state than a low temperature rendering process. Furthermore it has been found that the invention can provide an improved solid product namely the bone and also the protein meal.

While the invention has been described with reference to removing tallow from tallow containing raw materials, it is envisaged that the process can be used to separate lipids from lipid containing material where there is present a lipid, water and a solid substance, and where the water is entrained within the superheated steam flow and the lipid is extracted in a liquid state from the solid residue.

In this specification:

"comprising" means 'consisting at least in part of', that is to say when interrupting independent claims including that term, the features prefaced by that term in each claim will need to be present but other features can also be present.

BRIEF DESCRIPTION OF THE DRAWINGS

The invention is further described with reference to the accompanying drawings which illustrate the invention but are not to be construed as limiting the scope of the invention. In the drawings.

DETAILED DESCRIPTION OF PREFERRED FORM

In a preferred form the invention comprises an apparatus for recovering tallow from a tallow containing material, by subjecting the tallow containing material 9A to superheated steam 34 and recovering the tallow in a liquid state.

Figure 1:
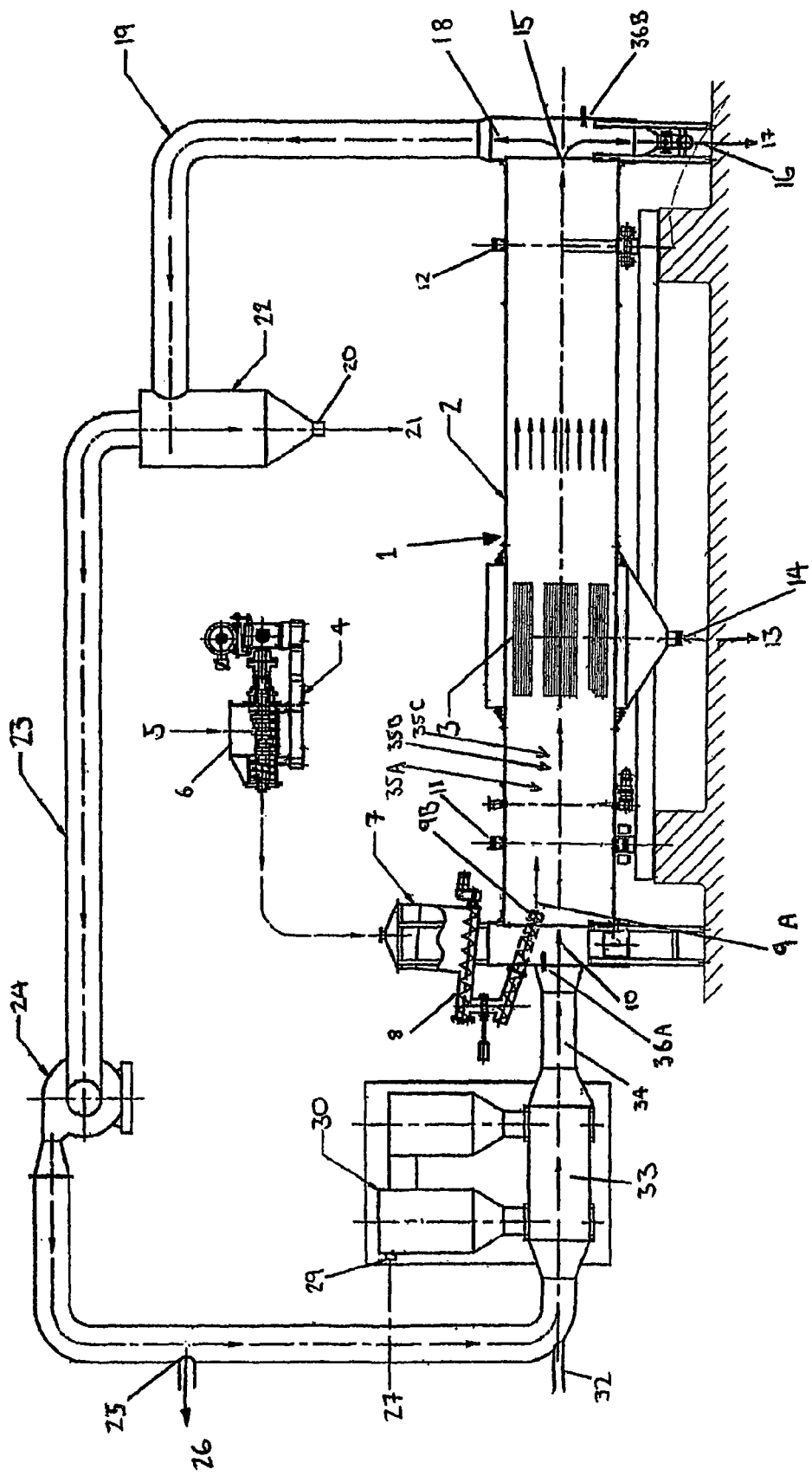
FIG. 1 is a schematic view of embodiment of the primary apparatus of the invention.

Referring initially to a first embodiment of the present invention depicted in FIG. 1, the tallow extraction process takes place within reaction chamber 1 which is substantially free from oxygen. Raw material 5 is fed via inlet 6 to grinder 4, before being fed into product holding bin 7. The augered delivery means 8 feeds the tallow containing material 9A from the product holding bin 7 to the rotating drum 2 of reaction chamber 1 via inlet 9B.

Inlet 32 provides for co-current injection of super-heated steam 34 with the tallow containing material 9A. The tallow containing material 9A separates into three phases: water held within the tallow containing material 9A becomes entrained with the super-heated steam 34 to form water vapour 35A; liquid tallow 35B; and a solid meat/bone mixture 35C. These phases flow along the rotating drum 2.

Within the reaction chamber 1 is a tallow screen 3 comprised of either a perforated stainless screen and/or a wedge wire screen for example, fitted to the rotating drum 2. The tallow screen 3 separates the liquid tallow 35B from water vapour 35A and solid meat/bone mixture 35C. Primary tallow product 13 is separated from the reaction chamber 1 via outlet 14.

The remaining tallow containing material 9A and super-heated steam 34 continue to flow through the rotating drum 2 at a rate of 2.5 meters per second. At the end of the reaction chamber 1 there is a cowling 15. In the upper part of cowling 15 there is an outlet through which steam vapors 18 exit. The solid residue 17 is removed from the reaction chamber 1 via outlet 16. The superheated steam vapors 18 pass along ducting 19 to a separator such as a cyclone separator 22 wherein solids 21 entrained in the super-heated steam vapors 18 are removed via outlet means 20 and returned to the process cycle such as to holding bin 7.

The remaining superheated steam vapors continue along ducting 23 to a fan 24. Process fan 24 controls the flow rate of the reaction process. Siphoning means 25 removes excess steam from the ducting. Condensate is removed from the siphoned off steam 26 as further discussed below in relation to FIG. 4.

Non-condensables from the siphoned steam are returned to combustion unit 30 via inlet means 29.

Atomised water is supplied to the apparatus via inlet means 32 and is passed through heat exchange means 33 to provide the initial volume of superheated steam. Heat exchange means 33 is heated via combustion unit 30.

Reaction chamber 1 is rotated through a normal driving means such as through drum tyres 11 and 12.

Also present are temperature sensing probes 36A and 36B which allow for the measurement of temperature within reaction chamber 1, to monitor temperatures and where necessary feed a signal back to combustion unit 30 to increase or decrease the steam inlet temperature. These probes may provide a measurement 4 times a second with a steam velocity of 2.5 meters per second to ensure close control the steam temperature, for example.

Figure 2:
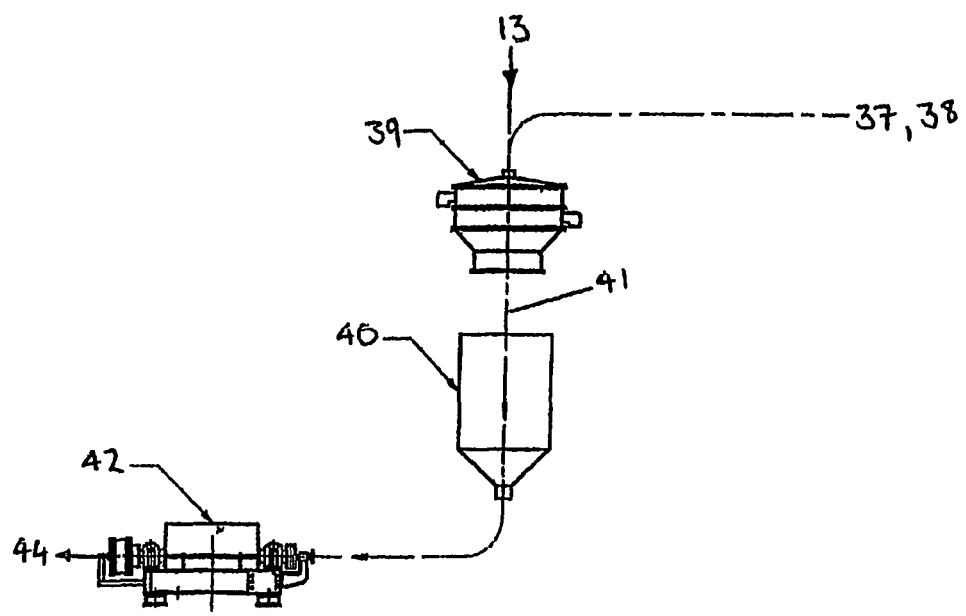
FIG. 2 is a schematic representation of the tallow recovery apparatus of the invention.
Figure 3:
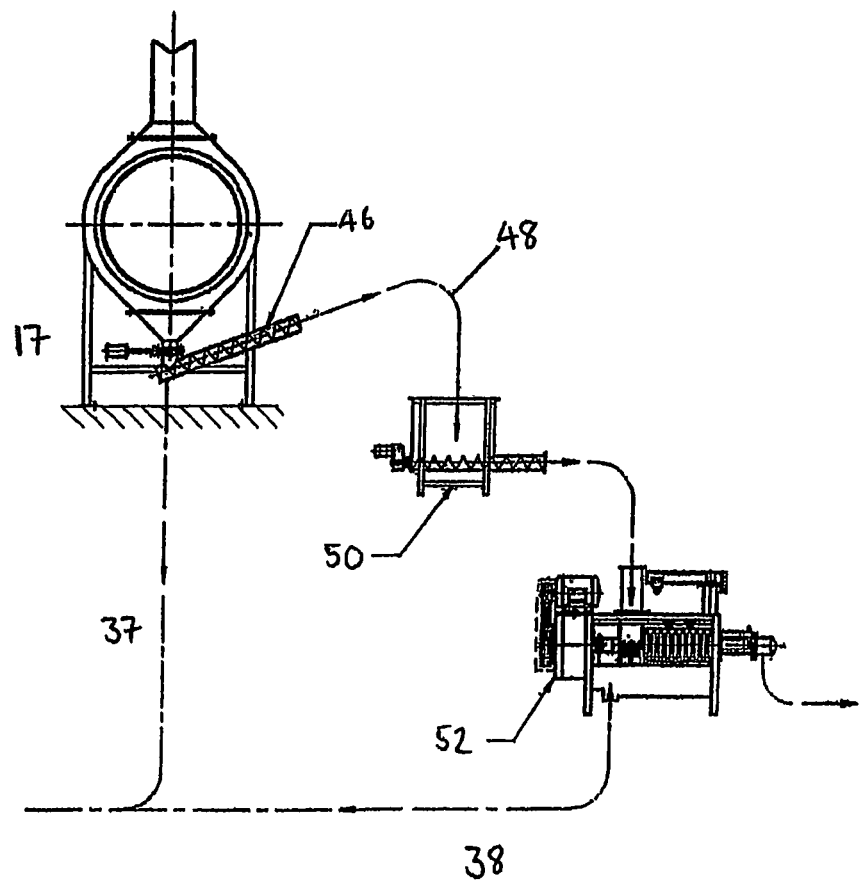
FIG. 3 is a schematic representation of the apparatus for treating the solid residue.

FIG. 2 is a schematic representation of the tallow purification apparatus of the invention. Primary tallow product 13 and if desired secondary tallow product 37 and tertiary tallow product 38 (obtained from the secondary and tertiary apparatus in FIG. 3 are fed into vibrator screen 39 which removes any large fines (solid particles) entrained with the tallow. These fines are returned to product holding bin 7. Subsequently the tallow product 41 is fed into buffer tank 40 which stores the tallow prior to being pumped to the decanter 42. The decanter 42 removes all remaining fine particles from the tallow to form the purified tallow product 44.

FIG. 3 is a schematic representation of the secondary and tertiary apparatus of the invention. Cooked product 17 is fed through inclined discharge screw 46 where cooked product discharge 48 moves up while the liquid tallow drains to the bottom and is drained off through a fitting as a secondary tallow stream 37. Cooked product discharge 48 is further fed into a holding tank 50 and then to screw press 52. Screw press 52 further squeezes the cooled product discharge 48 to produce tertiary tallow stream 38 and leaving purified cooked product 54.

Figure 4:
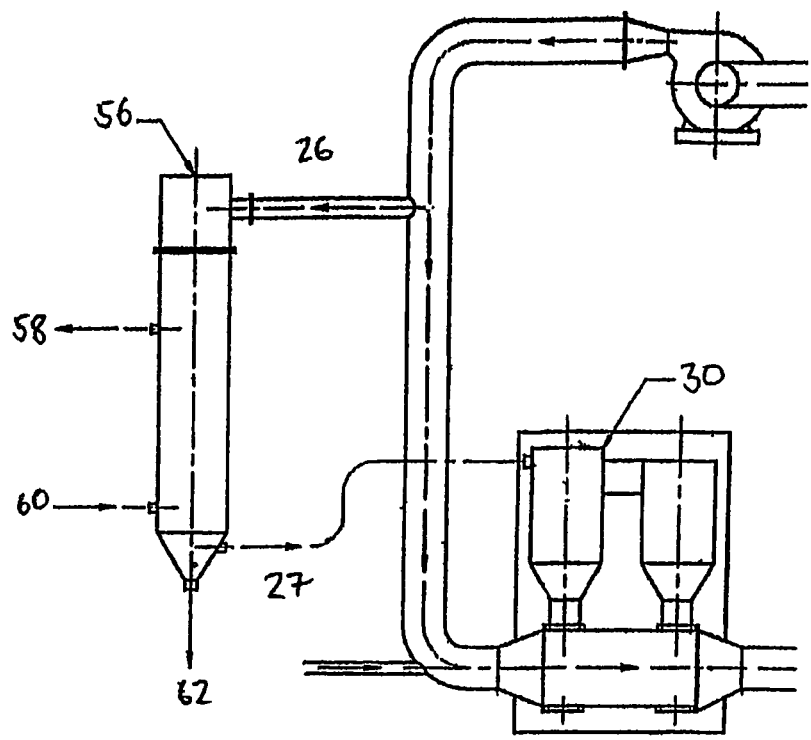
FIG. 4 is a schematic representation of the apparatus for recovering and treating excess steam and non-condensable gases.

FIG. 4 is a schematic representation of the condenser apparatus of the invention. The siphoned off steam 26 is fed to and through condenser 56. Cold water 60 is injected into condenser 56 and hot water 58 is removed and the heat values recovered. The removal of condensate 62 which comprises water and a minimum amount of tallow and other impurities is removed and discarded. Non-condensables 27 are also removed from condenser 56 and are fed back into combustion unit 30.

Referring to a second embodiment of the present invention as depicted in FIG. 1, the tallow extraction process takes place within reaction chamber 1 which is substantially free from oxygen. Raw material 5 is fed via inlet 6 to grinder 4, before being fed into product holding bin 7. The augered delivery means 8 feeds the tallow containing material 9A from the product holding bin 7 to the rotating drum 2 of reaction chamber 1 via inlet 9B.

Inlet 32 provides for co-current injection of super-heated steam 34 with the tallow containing material 9A. The tallow containing material 9A separates into three phases: water held within the tallow containing material 9A becomes entrained with the super-heated steam 34 to form water vapour 35A; liquid tallow 35B; and a solid meat/bone mixture 35C. These phases flow along the rotating drum 2 at a rate of about 2.5 meters per second.

At the end of the reaction chamber 1 there is a cowling 15. In the upper part of cowling 15 there is an outlet through which steam vapors 18 exit. The mixture of the solid residue and the tallow 17A is removed from the reaction chamber 1 via outlet 16. The superheated steam vapors 18 pass along ducting 19 to a separator such as a cyclone separator 22 wherein solids 21 entrained in the super-heated steam vapors 18 are removed via outlet means 20 and returned to the process cycle such as to holding bin 7.

The remaining superheated steam vapors continue along ducting 23 to a fan 24. Process fan 24 controls the flow rate of the reaction process. Siphoning means 25 removes excess steam from the ducting. Condensate is removed from the siphoned off steam 26 as discussed above in relation to FIG. 4.

Non-condensables from the siphoned steam are returned to combustion unit 30 via inlet means 29.

Atomised water is supplied to the apparatus via inlet means 32 and is passed through heat exchange means 33 to provide the initial volume of superheated steam. Heat exchange means 33 is heated via combustion unit 30.

Reaction chamber 1 is rotated through a normal driving means such as through drum tyres 11 and 12.

Also present are temperature sensing probes 36A and 36B which allow for the measurement of temperature within reaction chamber 1, to monitor temperatures and where necessary feed a signal back to combustion unit 30 to increase or decrease the steam inlet temperature. These probes may provide a measurement 4 times a second with a steam velocity of 2.5 meters per second to ensure close control the steam temperature, for example.

Figure 5:
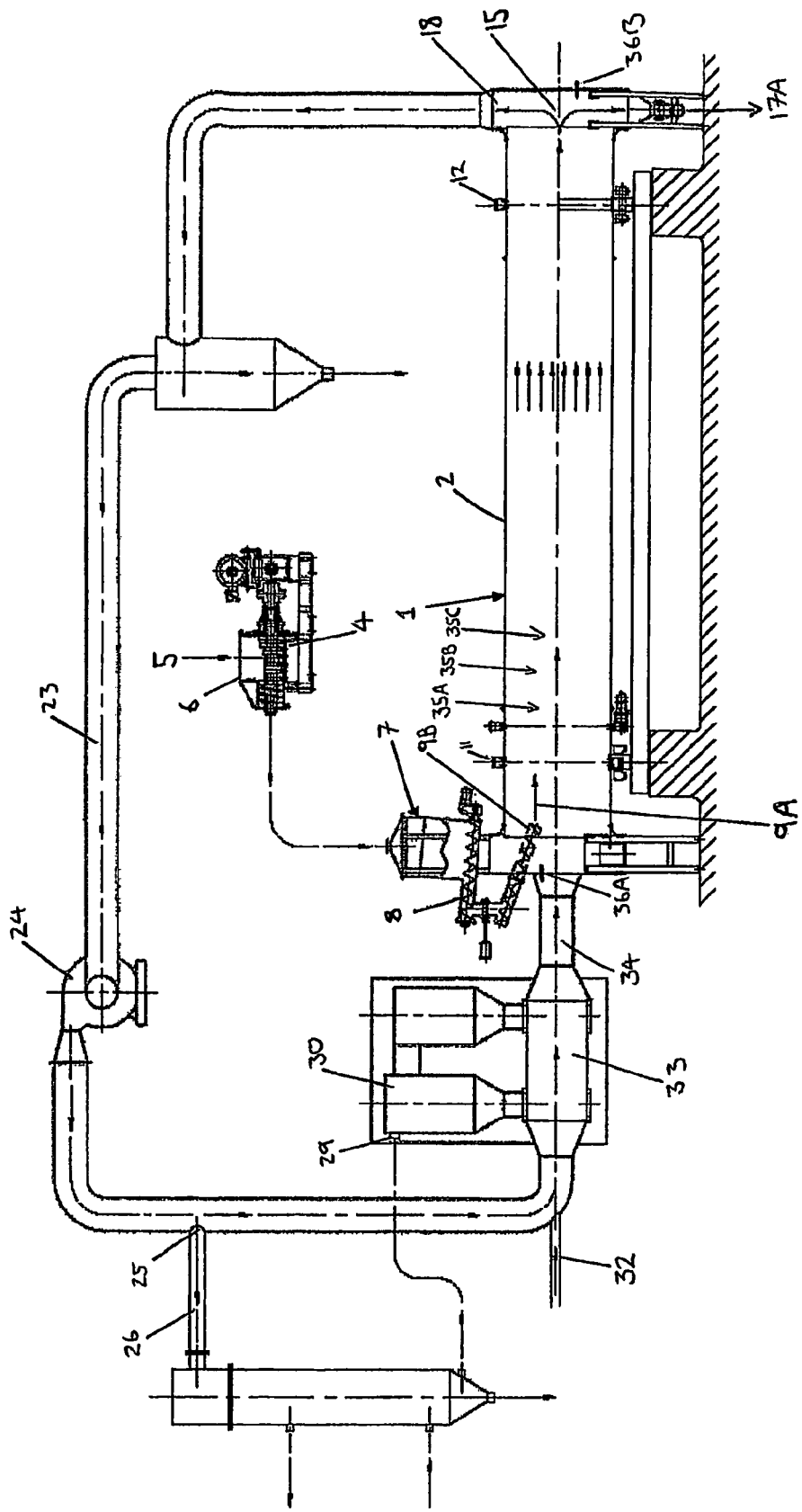
FIG. 5 is a schematic view of a second embodiment of the primary apparatus of the invention.
Figure 6:
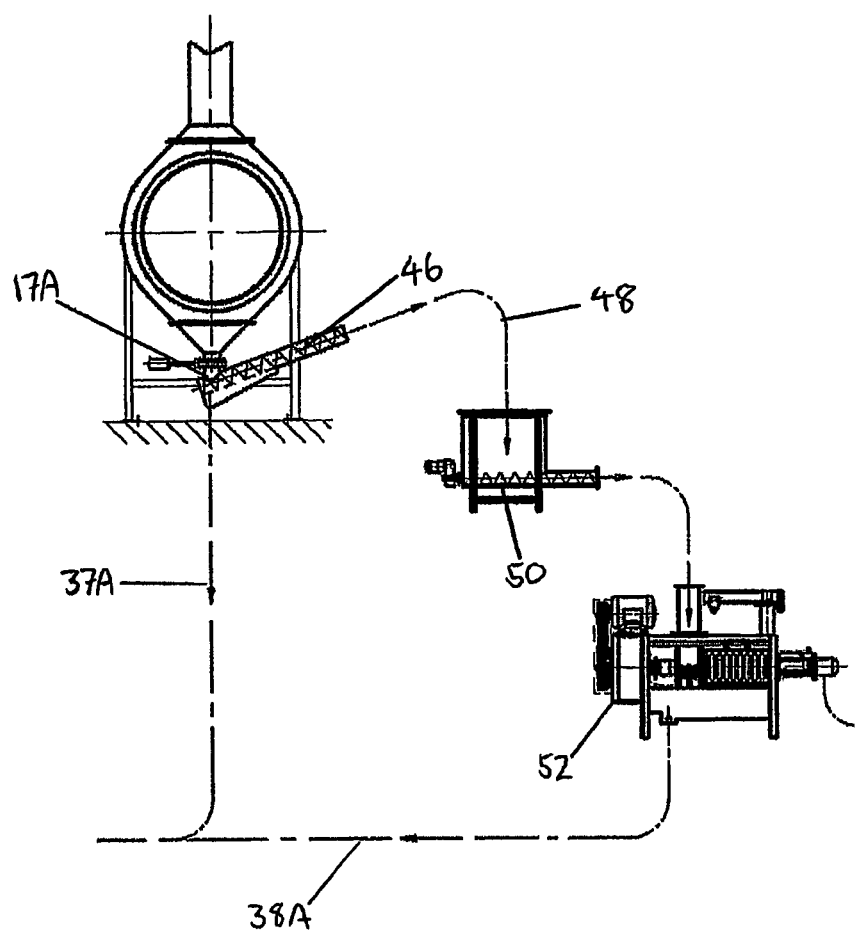
FIG. 6 is a schematic representation of the apparatus for treating and recovering the solid residue and tallow in the second embodiment of the invention.

FIG. 5 is a schematic representation of the secondary and tertiary apparatus of the second embodiment of the present invention. The mixture of the solid residue and the tallow 17A is fed through inclined discharge screw 46 where cooked product discharge 48 moves up while the liquid tallow drains to the bottom and is drained off through a fitting as a first tallow stream 37A. Cooked product discharge 48 is further fed into a holding tank 50 and then to screw press 52. Screw press 52 further squeezes the cooked product discharge 48 to produce further tallow stream 38A and leaving purified cooked product 54.

The first tallow stream 37A and the further tallow stream 38A can then be fed into the tallow purification apparatus illustrated in FIG. 2. The vibrator screen 39 removes any large fines (solid particles) entrained with the tallow. These fines are returned to product holding bin 7. Subsequently the tallow product 41 is fed into buffer tank 40 which stores the tallow prior to being pumped to the decanter 42. The decanter 42 removes all remaining fine particles from the tallow to form the purified tallow product 44.

While the invention has been described with reference to preferred embodiments it is not to be construed as limited thereto. For example while in the second embodiment a process has been described in which the mixture of the solid residue and the tallow is removed from at the end of the reaction chamber, the removal may occur at any or multiple stages along the reaction chamber. Furthermore where specified steps of features have been described and known equivalents exist therefore such equivalents are incorporated herein as if specifically set forth.

I claim:

1. A process for recovering tallow from a meat material, comprising:
   reducing the meat material to particulate form,
   conveying the meat material continually through a process chamber containing superheated steam and which is substantially free from oxygen so that the superheated steam contacts the particulate material to subject the meat material to superheated steam at a temperature above 220° C. for a period of time effective to liquefy and separate from the meat material a major amount of the tallow naturally occurring in the meat material, but not vaporize said amount of tallow, and
   recovering the liquefied and separated tallow naturally occurring in the meat material, in a liquid state separately from the meat material, while the superheated steam remains in a vapour state and entrains in the superheated steam water in the meat material.

2. The process according to claim 1 wherein the meat material comprises waste meat and bone material after separation of edible meat in a meat processing plant.

3. The process according to claim 1 wherein the steam is recycled and returned for treatment of further meat material.

4. The process according to claim 3 wherein the steam after separation from solid residue is fed sequentially through a further separation step where fine residual solids are removed, through a fan to assist in propelling the steam throughout the process cycle, through a siphon step whereby excess steam is removed to leave an amount of steam equivalent to that which started the cycle, and through a heating step where the steam is heated to return to a starting temperature before recycling.

5. The process according to claim 1 including monitoring the temperature of the superheated steam after subjecting the meat material to the steam and as necessary adjusting the temperature of the incoming steam before contacting the meat material to ensure that the steam remains in a vapour state throughout the process chamber.

6. The process according to claim 1 wherein the superheated steam is at a temperature in the range of above 220° C. to about 600° C.

7. The process according to claim 1 wherein the superheated steam is at a temperature in the range of above 220° C. to about 350° C.

8. The process according to claim 1 wherein the velocity of the superheated steam is between about 1.5 $ms^{-1}$ and about 6 $ms^{-1}$.

9. The process according to claim 1 wherein the velocity of the superheated steam is between about 2 $ms^{-1}$ and about 2.5 $ms^{-1}$.

10. The process according to claim 1 including subjecting the meat material to superheated steam in a processing chamber comprising a rotating cylinder.

11. The process according to claim 1 including continuing to convey the meat material remaining after tallow extraction further through the process chamber while continuing to subject the meat material to superheated steam to sterilise the meat material.

\* \* \* \* \*